(12) United States Patent
Kazama et al.

(10) Patent No.: US 11,242,013 B2
(45) Date of Patent: Feb. 8, 2022

(54) VEHICLE-MOUNTED CAMERA, VEHICLE-MOUNTED SYSTEM AND METHOD OF USING VEHICLE-MOUNTED CAMERA

(71) Applicant: DENSO CORPORATION, Kariya (JP)

(72) Inventors: Takeshi Kazama, Kariya (JP); Takayuki Kimura, Kariya (JP); Nobuhisa Shimizu, Kariya (JP)

(73) Assignee: DENSO CORPORATION, Kariya (JP)

( * ) Notice: Subject to any disclaimer, the term of this patent is extended or adjusted under 35 U.S.C. 154(b) by 154 days.

(21) Appl. No.: 16/514,018

(22) Filed: Jul. 17, 2019

(65) Prior Publication Data

US 2020/0023791 A1  Jan. 23, 2020

(30) Foreign Application Priority Data

Jul. 19, 2018 (JP) .............................. JP2018-135789

(51) Int. Cl.
| | |
|---|---|
| *B60R 11/04* | (2006.01) |
| *B60H 1/00* | (2006.01) |
| *G03B 17/55* | (2021.01) |
| *H04N 5/225* | (2006.01) |
| *B60R 11/00* | (2006.01) |

(52) U.S. Cl.
CPC .......... *B60R 11/04* (2013.01); *B60H 1/0055* (2013.01); *B60H 1/00271* (2013.01); *G03B 17/55* (2013.01); *H04N 5/22521* (2018.08); *B60R 2011/0026* (2013.01)

(58) Field of Classification Search
CPC ............... B60R 11/04; H04N 5/22521; B60H 1/00271; B60H 1/0055; G03B 17/55

USPC ........................................................ 348/148
See application file for complete search history.

(56) References Cited

U.S. PATENT DOCUMENTS

2011/0146320 A1*  6/2011  Tomiyama ........... B60H 1/3208
                                                              62/296
2019/0306966 A1* 10/2019  Byrne .................. H04N 5/2252

FOREIGN PATENT DOCUMENTS

| JP | 2002320126 | * 10/2002 | ............. H04N 5/225 |
|---|---|---|---|
| JP | 2002320126 A | 10/2002 | |

OTHER PUBLICATIONS

JP2002320126 Machine Translation (Year: 2002).*

* cited by examiner

*Primary Examiner* — Nguyen T Truong
(74) *Attorney, Agent, or Firm* — Maschoff Brennan

(57) ABSTRACT

To reduce discomfort of occupants caused by operation sound of a camera cooling system in a vehicle, a vehicle-mounted camera includes a camera cooler and a controller. The vehicle-mounted camera is installed inside of a windshield. The camera cooler cools the vehicle-mounted camera. The controller determines if the vehicle-mounted camera is in a high temperature state. If it is determined that the vehicle-mounted camera is in the high temperature state, the controller controls the camera cooler to operate. The controller controls an air conditioner to provide a sound generation process to generate concealing sound to conceal operation sound caused by the camera cooler when the air conditioner operates.

11 Claims, 5 Drawing Sheets

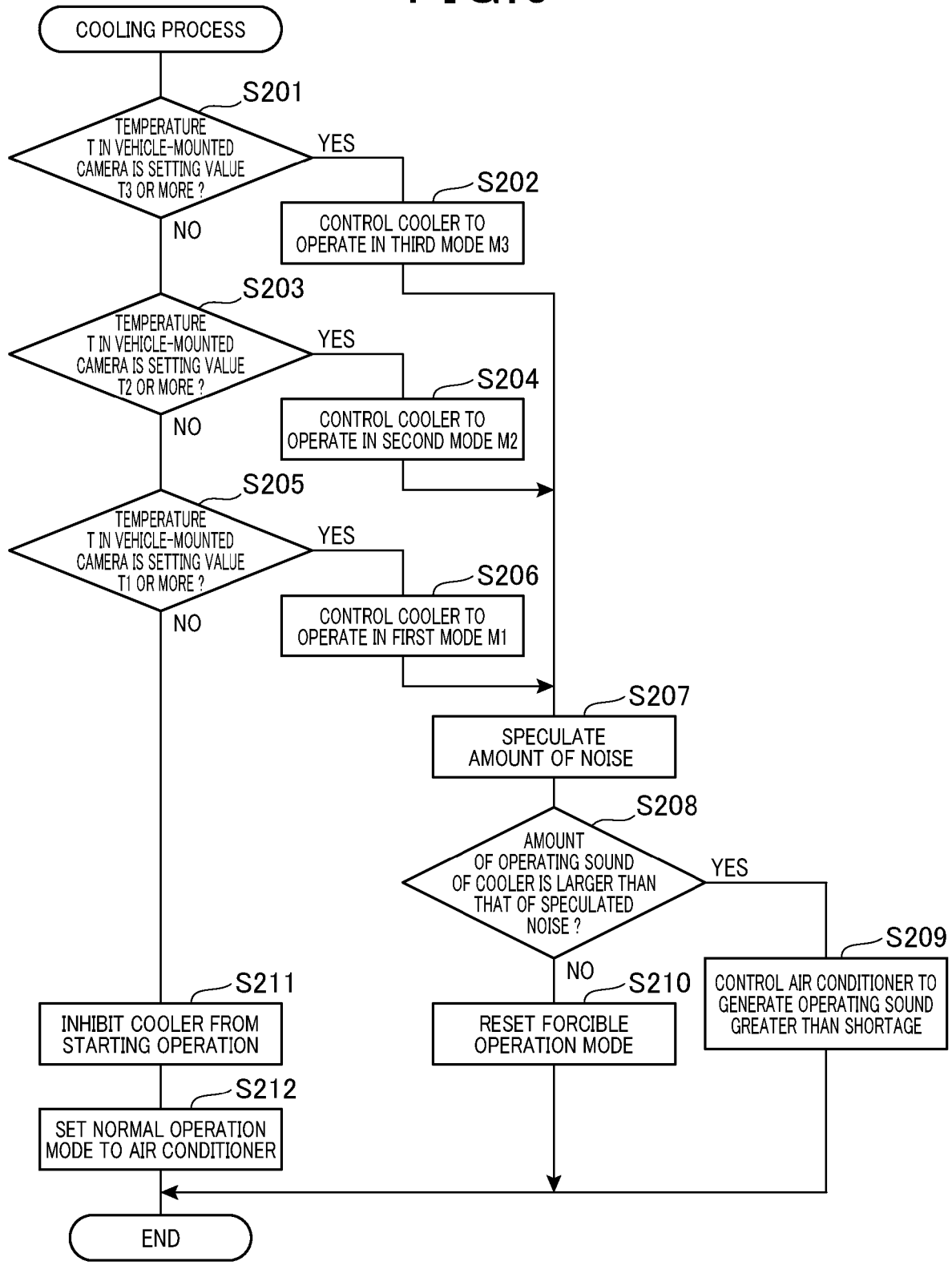

VEHICLE-MOUNTED CAMERA, VEHICLE-MOUNTED SYSTEM AND METHOD OF USING VEHICLE-MOUNTED CAMERA

CROSS-REFERENCE TO RELATED APPLICATION

This patent application is based on and claims priority to Japanese Patent Application No. 2018-135789, filed on Jul. 19, 2018 in the Japan Patent Office, the entire disclosure of which is hereby incorporated by reference herein.

BACKGROUND

Technical Field

Embodiments of this disclosure relate to a vehicle-mounted camera, a vehicle-mounted system and a method of using the vehicle-mounted camera.

Related Art

A conventional vehicle-mounted imaging system accommodates a vehicle-mounted camera. The vehicle-mounted camera generally includes an imager and a camera cooler.

An imaging area of the imager is partially shaded. In general, it is desirable that the vehicle-mounted imaging system starts image processing shortly after a switch of the vehicle-mounted imaging system is turned on. However, interior temperature of a vehicle parking in a sunny place in summer frequently exceeds 80 degrees centigrade. For this reason, the vehicle-mounted camera and accordingly the imager are in a high temperature state, i.e., hot, immediately after a driver enters the vehicle, thereby generating fixed pattern noise resulting in delay in start of the image processing. As a countermeasure, a conventional vehicle-mounted imaging system employs and activates a camera cooler to cool the vehicle-mounted camera when the vehicle-mounted camera is in the high-temperature state. In general, the conventional camera cooler employs a cooling fan and is attached to a housing of the vehicle-mounted camera in the vehicle-mounted imaging system.

Further, the vehicle-mounted camera mounted on the vehicle-mounted imaging system is commonly installed on an upper part of a windshield of the vehicle. For example, the conventional vehicle-mounted camera is attached either to an inside of the upper part of the windshield or a rear side (i.e., an outside) of a room mirror. As a result, the camera cooler operates close to ears of a driver. Hence, because an operation sound caused by operation of such a camera cooler can be noisy (i.e., an unpleasant sound) for an occupant such as a driver, etc., a degree of discomfort is sought to be reduced.

SUMMARY

Accordingly, one aspect of the present disclosure provides a novel vehicle-mounted camera mounted inside of a windshield of a vehicle. The vehicle-mounted camera includes a camera cooler to cool the vehicle-mounted camera and a controller. The controller includes: a determiner to determine if the vehicle-mounted camera is in a high temperature state of a given degree of temperature; an actuator to activate the camera cooler when the determiner determines that the vehicle-mounted camera is in the high temperature state; and a processor to perform an operation sound generation process to generate operation sound to conceal operation sound caused by operation of the camera cooler when the camera cooler operates.

Another aspect of the present disclosure provides a novel vehicle-mounted system that includes the vehicle-mounted camera disposed inside of a windshield of a vehicle (101); an air conditioner with a defroster, and an audio system. The processor activates at least one of the air conditioner and the audio system to perform the concealing sound generation process to generate applicable one of operation sound and audio sound.

Yet another aspect of the present disclosure provides a novel method of using the vehicle-mounted camera system comprising the steps of: detecting a degree of temperature of the vehicle-mounted camera; determining if the vehicle-mounted camera is in a high temperature state of a given degree of temperature; and cooling the vehicle-mounted camera with the camera cooler when the vehicle-mounted camera is in the high temperature state.

The novel method further includes the step of performing a concealing sound generation process to generate concealing sound to conceal operation sound generated by the camera cooler when the operation sound of the camera cooler is a given level or more.

With the above-described configuration of the one aspect of the present disclosure, the operation sound generation process is performed when it is determined that the camera is in the high temperature state, and the camera cooler is activated accordingly. Hence, the operation sound of the camera cooler can be made unnoticeable (i.e., disappear into the generated sound (e.g., another operation sound)). Accordingly, the occupants can reduce the degree of discomfort caused by the operation sound of the camera cooler.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein:

FIG. 6 is a flowchart illustrating an exemplary cooling process according to the second embodiment of the present disclosure

DETAILED DESCRIPTION

Figure 1:
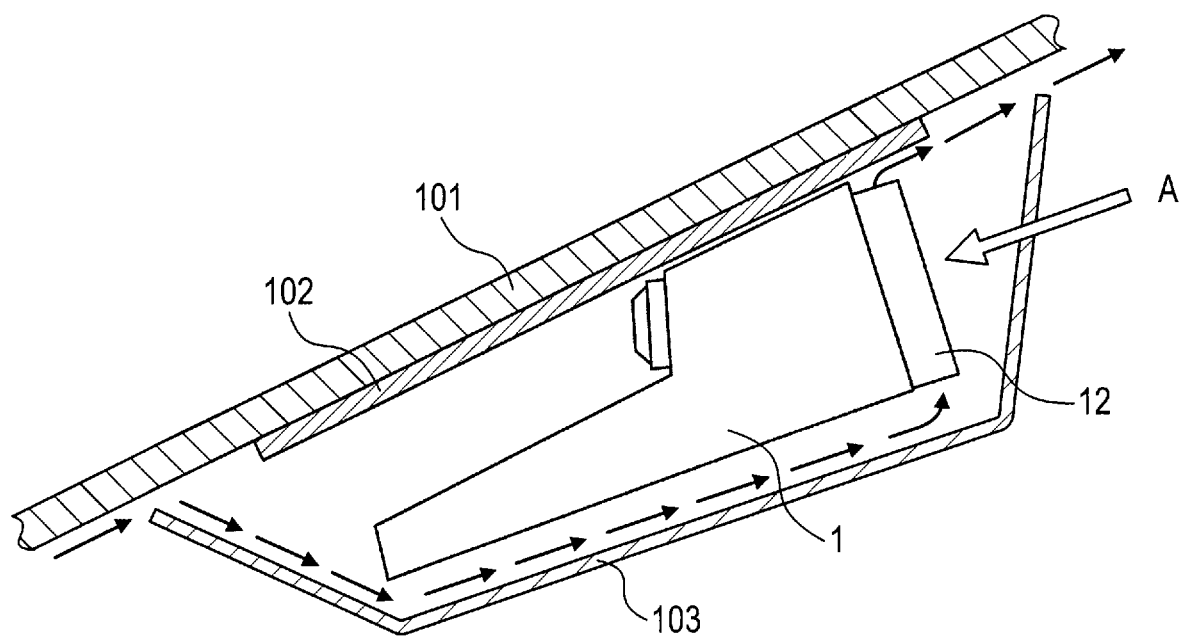
FIG. 1 is a side view illustrating an exemplary vehicle-mounted camera according to one embodiment of the present disclosure.

According to one aspects of the present disclosure, it is an object to reduce a degree of discomfort caused by an operation sound of the camera cooler. Referring now to the drawings, wherein like reference numerals designate identical or corresponding parts throughout the several views thereof, and in particular to FIG. 1, an exemplary configuration of the first embodiment of the present disclosure is described. As illustrated in the drawing, a vehicle-mounted camera 1 of FIG. 1 is installed inside of a windshield 101 of a vehicle to image a front view of the vehicle. Specifically, the vehicle-mounted camera 1 is attached to an inner surface of the windshield 101 via a bracket 102. More specifically, a position to which the vehicle-mounted camera 1 is attached is an upper inner part of the windshield 101 near a room mirror. A bottom of the vehicle-mounted camera 1 is covered by a design cover 103. Further, a given space is formed between a housing of the vehicle-mounted camera 1 and the design covers 103 to allow air to flow in and out.

Figure 2:
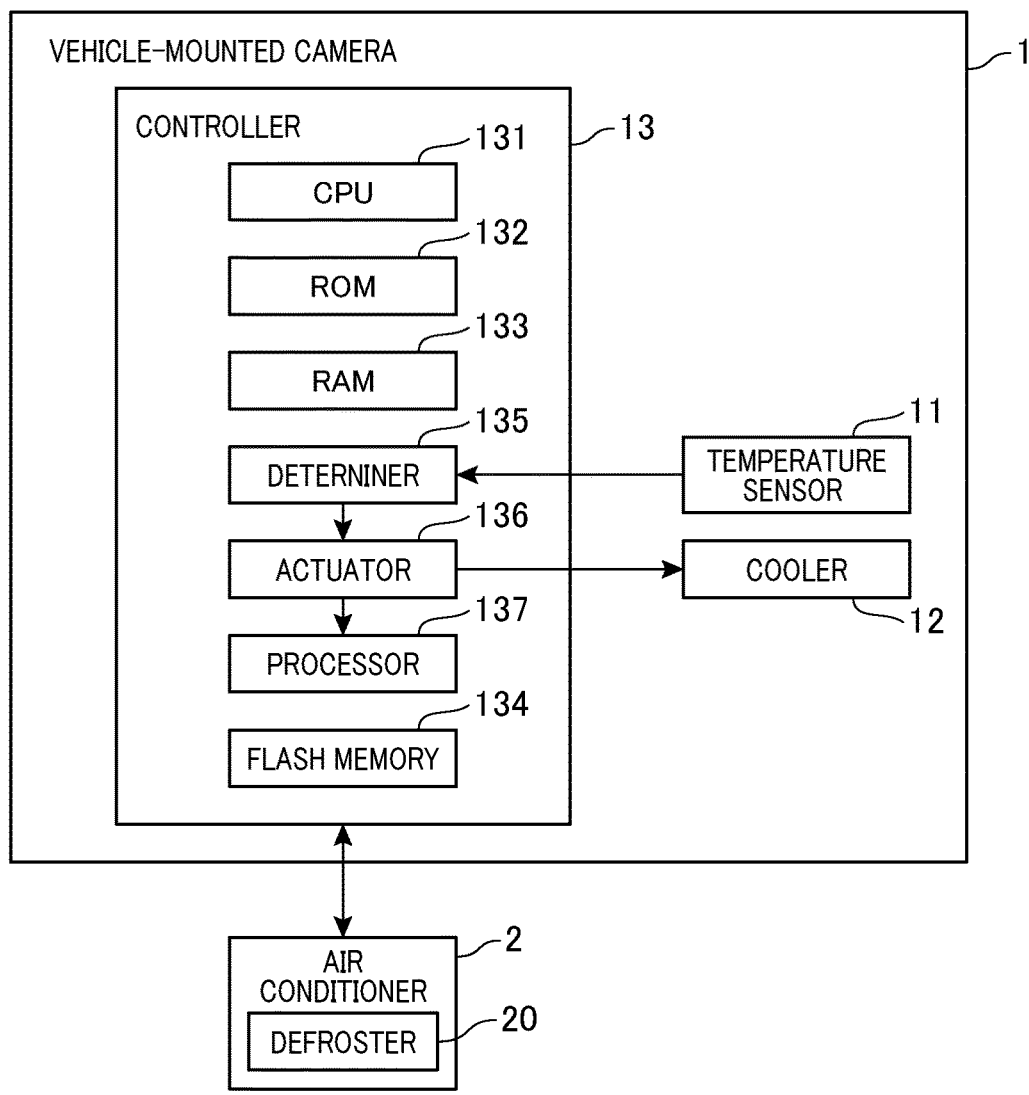
FIG. 2 is a block diagram illustrating an exemplary configuration of a camera cooler that cools the vehicle-mounted camera according to a first embodiment of the present disclosure.

As shown in FIG. 2, the vehicle-mounted camera 1 includes a temperature sensor 11, a camera cooler 12, and a controller 13. The temperature sensor 11 is composed of a thermometer to detect interior temperature of the vehicle-mounted camera 1. In this embodiment of the present disclosure, the temperature sensor 11 is mounted on a control board of the controller 13. The temperature sensor 11 outputs a temperature detection signal to the controller 13.

Figure 3:
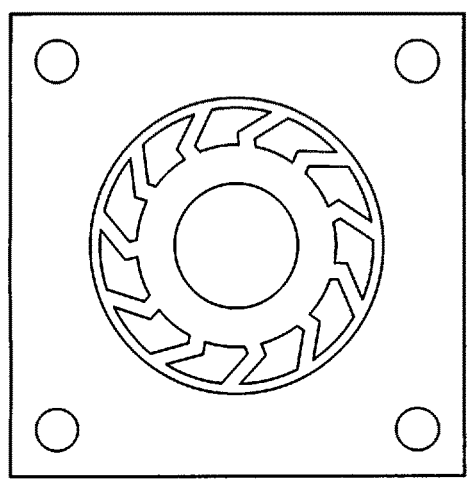
FIG. 3 is a diagram illustrating an exemplary cooling fan viewed in a direction shown by an arrow A in FIG. 1 according to one embodiment of the present disclosure.

The camera cooler 12 is composed of a cooling fan to cool the vehicle-mounted camera 1. Specifically, when interior temperature of the vehicle-mounted camera 1 is high, the imager and the controller 13 or the like sometimes exceed respective heat resisting temperatures depending on degrees of temperature. In this situation, general processing such as image processing, etc., performed by the controller 13 possibly needs to be stopped. Otherwise, noise or other problems may be likely to occur. Then, the camera cooler 12 is provided as a measure to cool the vehicle-mounted camera 1 when temperature in the vehicle-mounted camera 1 is high. The camera cooler 12 is preferably positioned in the vehicle-mounted camera 1 at a section facing a substrate, on which an electronic component, such as an imager, etc., generating a large amount of heat when the vehicle-mounted camera 1 operates is mounted. Hence, in this embodiment of the present disclosure, the camera cooler 12 is attached to a rear portion of a housing of the vehicle-mounted camera 1 as one example. However, the position of the vehicle-mounted camera 1 in the housing, to which the camera cooler 12 is attached is not particularly limited, and can be a bottom or the like of the housing of the vehicle-mounted camera 1. FIG. 3 illustrates an exemplary cooling fan viewed from a direction shown by an arrow A in FIG. 1. A quantity of air supplied by the camera cooler 12 is divided to multiple stages to be switched. That is, in this embodiment of the present disclosure, three stages of small, medium and large stages are employed as one example.

The controller 13 may be composed of a control board to control the vehicle-mounted camera 1. The controller 13 mainly includes a well-known micro-computer that includes a CPU (central processing unit) 131, a ROM (read only memory) 132, and a RAM (random access memory) 133. The micro-computer also includes a determiner 135, an actuator 136 and a processor 137. The micro-computer further includes a flash memory 134 or the like. The CPU 131 implements program stored in the ROM 132 acting as a substantive non-transitory recording medium. When the program runs, either a method or a system is performed in association with the program. Specifically, in addition to a general process to realize various functions of the camera, the controller 13 performs a cooling process in accordance with the program as described later in detail with reference to FIG. 4. The controller 13 can be either a single micro-computer or more than one micro-computer. Further, a system of achieving the function of the controller 13 is not limited to the software, and includes single or multiple hardware that at least partially achieve the functions of the controller 13. For example, when the above-described functions are performed by an electronic circuit as hardware, the electronic circuit may include a digital circuit, an analog circuit, or a combination of these circuits.

The controller 13 controls the camera cooler 12 to cool the vehicle-mounted camera 1 by sending an appropriate quantity of air in accordance with a degree of temperature detected by the temperature sensor 11. Specifically, the controller 13 controls the camera cooler 12 to operate in one of a first mode M1, a second mode M2 and a third mode M3, in which small, medium and large vols of air are sent, respectively.

The vehicle-mounted camera 1 is enabled to communicate with an air conditioner also installed in the vehicle as an air conditioner equipment. Communications between the vehicle-mounted camera 1 and the air conditioner 2 can be performed through a vehicle interior LAN, and are either direct communications or wireless communications or the like.

Various operating conditions to operate the air conditioner 2, such as start and stop of operating the air conditioner 2, switching of air sending values, and start and stop of defrosting with a defroster 20 can be optionally set by occupants. The defroster 20 is a functional device included in the air conditioner 2 and sends air to an inside of the windshield 101. The greater the quantity of air supplied by the air conditioner 2, the greater the operation sound of the air conditioner 2. Further, when the defroster 20 operates, the operation sound of the air conditioner 2 significantly increases. In this embodiment of the present disclosure, the air conditioner 2 operates in either a normal operation mode, in which an operating condition is set by an occupant, or a forcible operation mode, in which an operating condition is set based on an instruction from the vehicle-mounted camera 1 regardless of an intent of the occupant. The forcible operation mode is an operation mode used in a situation where an operation sound of the camera cooler 12 is to be hidden behind (i.e., disappear into) the operation sound of the air conditioner 2.

Herein below, an exemplary cooling process performed by the controller 13 is described with reference to a flow-chart of FIG. 4. The cooling process is periodically performed as long as an ignition switch is in an on state.

First, in step S101, the controller 13 determines if a degree of temperature in the vehicle-mounted camera 1 is a third set value T3 or more based on a degree of temperature detected and input by the temperature sensor 11. In this embodiment of the present disclosure, the third set value T3 is 80 degrees centigrade. If the controller 13 determines in step S101 that the interior temperature of the vehicle-mounted camera 1 is the third set value T3 or more (i.e., Yes, in step S101), the process proceeds to step S102.

In step S102, the controller 13 controls the camera cooler 12 to operate in the third mode M3. Subsequently, in step S103, the controller 13 determines if an amount of operation sound of the air conditioner 2 operating in a normal operation mode is equivalent to an amount of an operation sound generated by the camera cooler 12 operating in the third mode M3 or more. Here, the normal operation mode represents an operating condition of the air conditioner 2 lastly set intentionally by an occupant. Thus, a present mode other than a forcible operation mode can be the normal operation mode. Further, when a present mode is the forcible operation mode, a lastly set mode other than the forcible operation mode as an operating condition can be the normal operation mode. Further, in this embodiment of the present disclosure, the determination in step S103 is not based on an amount of an actual operation sound, but is based on a given assumed value of the operation sound. Specifically, a relation between amounts of operation sounds of the air conditioner 2 caused in accordance with the respective operating states and amounts of operation sounds of the camera cooler 12 caused in accordance with the respective modes are predetermined and is checked in step S103.

That is, the relation between the respective amounts of operation sounds V1 to V6 are predetermined to meet the following inequality, wherein a reference character V1 represents an amount of operation sound generated by the camera cooler 12 when operating in the first mode M1, a reference character V2 represents an amount of operation sound generated by the air conditioner 2 in an operating condition where an quantity of air is relatively small and a defroster 20 stops operating, and a reference character V3 represents an amount of operation sound generated by the camera cooler 12 when operating in the second mode M2. Further, in the following inequality, a reference character V4 represents an amount of operation sound generated by the air conditioner 2 in an operating condition where a quantity of air is relatively large and the defroster 20 stops operating, a reference character V5 represents an amount of operation sound generated by the camera cooler 12 operating in the third mode M3, and a reference character V6 represents an amount of operation sound generated by the air conditioner 2 in an operating condition where a quantity of air is relatively large and the defroster 20 is operating.

$$V1 \leq V2 \leq V3 \leq V4 \leq V5 \leq V6$$

Hence, if the controller 13 determines in step S103 that an amount of operation sound of the air conditioner 2 operating in the normal operation mode is not more than that of the operation sound of the camera cooler 12 operating in the third mode M3 (i.e., No, in step S103), the process proceeds to step S104.

In step S104, the controller 13 controls the air conditioner 2 to send a relatively large quantity of air while activating the defroster 20. That is, the controller 13 controls the air conditioner 2 to operate in a forcible operation mode to generate the operation sound of the amount V6 larger than that of the amount V5 generated by the camera cooler 12 operating in the third mode M3. Subsequently, the cooling process of FIG. 4 is terminated.

Figure 4:
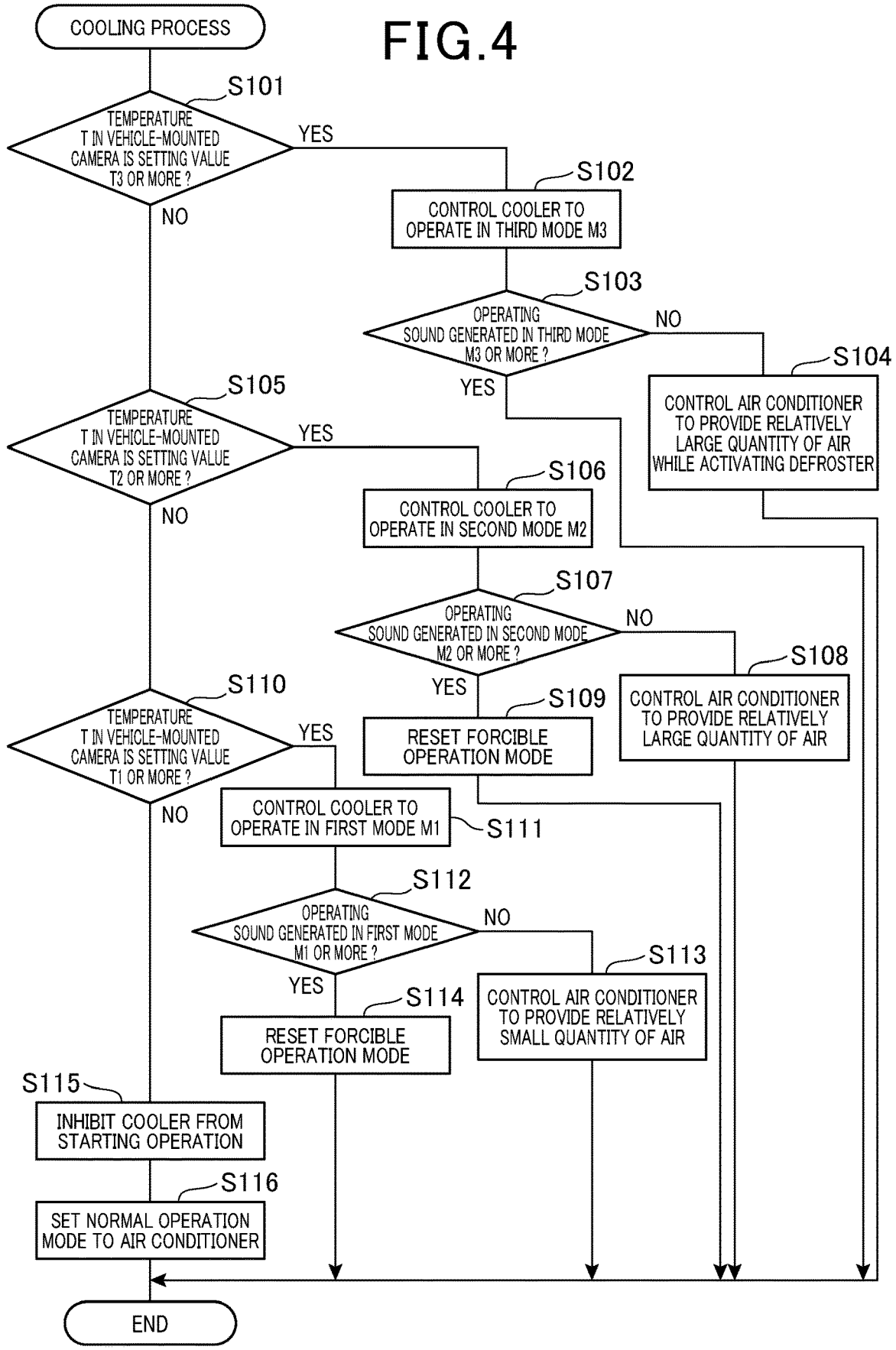
FIG. 4 a flowchart illustrating an exemplary cooling process according to the first embodiment of the present disclosure.

By contrast, if the controller 13 determines in step S103 that an amount of operation sound of the air conditioner 2 operating in the normal operation mode is more than that of the operation sound of the camera cooler 12 operating in the third mode M3 (i.e., Yes, in step S103), the cooling process of FIG. 4 is quickly terminated.

Further, in step S101, if the controller 13 determines that a degree of the interior temperature of the vehicle-mounted camera 1 is not the third set value T3 or more (i.e., No, in step S101), the process proceeds to step S105. In step S105, the controller 13 determines if the degree of temperature in the vehicle-mounted camera 1 is the second set value T2 lower than the third set value T3 or more based on the temperature detected and input from the temperature sensor 11. In this embodiment of the present disclosure, the second set value T2 may be 60 degrees centigrade. Subsequently, in step S105, if the controller 13 determines that the degree of temperature in the vehicle-mounted camera 1 is the second set value T2 or more (i.e., Yes, in step S105), the process proceeds to step S106.

In step S106, the controller 13 controls the camera cooler 12 to operate in the second mode M2 with less cooling performance than in the third mode M3. Subsequently, in step S107, the controller 13 determines if the amount of operation sound of the air conditioner 2 operating in the normal operation mode is equivalent to the amount of operation sound of the camera cooler 12 operating in the second mode M2 or more. In step S107, if the controller 13 determines that the amount of operation sound of the air conditioner 2 operating in the normal operation mode is not equivalent to the amount of operation sound of the camera cooler 12 operating in the second mode M2 or more (i.e., No, in step S107), the process proceeds to step S108.

In step S108, the controller 13 controls the air conditioner 2 to send a relatively large quantity of air without activating the defroster 20 of the air conditioner 2. That is, the controller 13 controls the air conditioner 2 to operate in a forcible operation mode so that the air conditioner 2 generates operation sound equivalent to the amount V4 greater the third amount V3 of operation sound generated by the camera cooler 12 operating in the second mode M2. Subsequently, the cooling process of FIG. 4 is terminated.

By contrast, in step S107, if the controller 13 determines that the amount of operation sound of the air conditioner 2 operating in the normal operation mode is equivalent to the amount of operation sound of the camera cooler 12 operating in the second mode M2 or more (i.e., Yes, in step S107), the process proceeds to step S109.

In step S109, when the air conditioner 2 is operating in the forcible operation mode, the controller 13 terminates (i.e., resets) the forcible operation mode and brings an operating condition back to the normal operation mode. At that time, however, when the air conditioner 2 is operating in the normal operation mode, the controller 13 keeps such an operation condition. Subsequently, the cooling process shown in FIG. 4 is terminated.

Further, in step S105, if the controller 13 determines by contrast that the degree of temperature in the vehicle-mounted camera 1 is not the second set value T2 or more (i.e., No, in step S105), the process proceeds to step S110. In step S110, the controller 13 determines based on the degree of temperature in the vehicle-mounted camera 1 detected and input by the temperature sensor 11 if the degree of temperature is more than the first set value T1 lower than the second set value T2. In this embodiment of the present disclosure, the first set value T1 may be 40 degrees centigrade. In step S110, if the controller 13 determines that the degree of temperature in the vehicle-mounted camera 1 is more than the first set value T1 (i.e., Yes, in step S110), the process proceeds to step S111.

In step S111, the controller 13 controls the camera cooler 12 to operate in the first mode M1 with less cooling performance than in the second mode M2. Subsequently, in step S112, the controller 13 determines if an amount of sound of the air conditioner 2 operating in the normal operation mode is more than the amount of sound of the camera cooler 12 operating in the first mode M1. In step S112, if the controller 13 determines that the amount of sound of the air conditioner 2 operating in the normal operation mode is not more than the amount of sound of the camera cooler 12 operating in the first mode M1 (i.e., No, in step S112), the process proceeds to step S113.

In step S113, the controller 13 controls the air conditioner 2 to send a relatively small quantity of air without activating the defroster 20 of the air conditioner 2. That is, the controller 13 controls the air conditioner 2 to operate in the forcible operation mode and generate an amount of operation sound equivalent to the second amount V2 greater than the first amount V1 generated by the camera cooler 12 operating in the first mode M1.

Subsequently, the cooling process shown in FIG. 4 is terminated.

By contrast, in step S112, if the controller 13 determines that the amount of sound of the air conditioner 2 operating in the normal operation mode is more than the amount of sound of the camera cooler 12 operating in the first mode M1 (i.e., Yes, in step S112), the process proceeds to step S114.

In step S114, when the air conditioner 2 is operating in the forcible operation mode, the controller 13 terminates (i.e., resets) the forcible operation mode and brings an operation condition back to the normal operation mode. However, when the air conditioner 2 is operating in the normal operation mode at that time, the controller 13 keeps such an operation condition. Subsequently, the cooling process shown in FIG. 4 is terminated.

Further, in step S110, if the controller 13 determines that the temperature in the vehicle-mounted camera 1 is not more than the first set value T1 (i.e., No, in step S110), the process proceeds to step S115. In step S115, the controller 13 inhibits the camera cooler 12 from starting operation. That is, when the degree of temperature in the vehicle-mounted camera 1 is less than the first set value T1, since it is not determined that the vehicle-mounted camera 1 is in the high-temperature state and needs to be cooled by the camera cooler 12, the controller 13 inhibits the camera cooler 12 from operating. Hence, when the camera cooler 12 is already operating, the controller 13 deactivates the camera cooler 12.

Subsequently, the controller 13 sets the normal operation mode to the air conditioner 2 as an operating mode in S116. That is because, when the degree of temperature in the vehicle-mounted camera 1 is less than the first set value T1, since the camera cooler 12 neither operates nor generates operation sound thereby not necessitating the other operation sound to conceal, the air conditioner 2 does not need to operate in the forcible operation mode. In this embodiment of the present disclosure, when the air conditioner 2 operates in the forcible operation mode, the controller 13 terminates (i.e., resets) the forcible operation mode and brings an operation condition back to the normal operation mode. Specifically, when the air conditioner 2 was not operating just before operating in the forcible operation mode, the controller 13 deactivates the air conditioner 2. By contrast, when the air conditioner 2 was operating just before operating in the forcible operation mode, the controller 13 brings an operating condition back to the normal operation mode set just before operating in the forcible operation mode. Subsequently, the cooling process shown in FIG. 4 is terminated.

Hence, according to the first embodiment of the present disclosure, at least one of the below described advantages can be obtained. That is, according to the first embodiment of the present disclosure, when it is determined that temperature in the vehicle-mounted camera 1 is more than one of first to third values T1 to T3, and the vehicle-mounted camera 1 is in one of the high-temperature states, the camera cooler 12 operates in the first to third modes M1 to M3, respectively. At that time, to generate an operation sound in the air conditioner as a concealing sound for concealing the operation sound generated by the camera cooler 12 during the operation of the camera cooler 12 thereby making the operation sound of the camera cooler 12 unnoticeable, an operation sound generation process is executed in steps S104, S108 and S113 to operate the air conditioner 2 of the vehicle. Hence, while cooling the vehicle camera 1 in the high temperature state, the operation sound generated by the camera cooler 12 as an uncomfortable sound for the occupant can be effectively made unnoticeable by the operation sound of the air conditioner 2. That is, the operation sound of the camera cooler 12 can disappear into the operation sound of the air conditioner 2. Aar, the occupant can reduce a degree of discomfort caused by the sound of the camera cooler 12. In addition, since the vehicle-mounted camera 1 in the high-temperature state is cooled by the air conditioner 2 in addition to the camera cooler 12, the temperature in the vehicle-mounted camera 1 can be more effectively decreased.

Further, according to the first embodiment of the present disclosure, when the camera cooler 12 operates in the second mode M2, the air conditioner 2 operates in the operation condition generating larger operation sound than when the camera cooler 12 operates in the first mode M1. Similarly, according to the first embodiment of the present disclosure, when the camera cooler 12 operates in the third mode M3, the air conditioner 2 operates in the operation condition generating yet larger operation sound than when the camera cooler 12 operates in the second mode M2. That is, the air conditioner 2 is controlled to generate the amounts of operation sounds V2, V4 and V6 greater than the amounts of operation sounds V1, V3 and V5 generated by the camera cooler 12 in respective first to third modes M1 to M3. That is, to conceal the operation sound of the camera cooler 12, the operation sound of the air conditioner 2 is generated. However, the operation sounds are desirably quiet as much as possible. Then, in the first embodiment of the present disclosure, to conceal the operation sound of a first amount V1 generated by the camera cooler 12 in the first mode M1, the air conditioner 2 is controlled to generate operation sound of the second amount V2. Similarly, to conceal the operation sound of the third amount V3 generated by the camera cooler 12 in the second mode M2, the air conditioner 2 is controlled to generate operation sound of the fourth amount V4. Further, to conceal the operation sound of the amount V5 generated by the camera cooler 12 in the third mode M3, the air conditioner 2 is controlled to generate operation sound of the sixth amount V6. Thus, while concealing the operation sound of the camera cooler 12 by using the operation sound of the air conditioner 2, an amount of operation sound generated by the air conditioner 2 can be effectively reduced.

In the first embodiment of the present disclosure, when a temperature condition with a degree of temperature greater than the degree of temperature T1 represents a first high temperature condition, a temperature condition with one of the degrees of temperature T2 and T3 represents a second high-temperature. Similarly, when a temperature condition with a degree of temperature greater than the degree of temperature T2 represents a first high temperature condition, a temperature condition with the degree of temperature T3 represents a second high-temperature. Further, when the first mode M1 represents just a first mode, one of the second and third modes M2 and M3 represents a second mode. Similarly, when the second mode M2 represents a first mode, the third mode M3 represents a second mode. Furthermore, the steps S101, S105 and S110 collectively represent a process performed by the determiner 135. Further, the steps S102, S106 and S111 collectively represent a process performed by the actuator 136. Further, the steps S104, S108 and S113 collectively represent a process performed by the processor 137.

Now, a second embodiment of the present disclosure is described with reference to FIG. 5 and applicable drawings. Since a basic configuration of a vehicle-mounted camera 1 of the second embodiment of the present disclosure is substantially the same as that of the first embodiment of the present disclosure, only a configuration different from that employed in the first embodiment is herein below mainly described.

Figure 5:
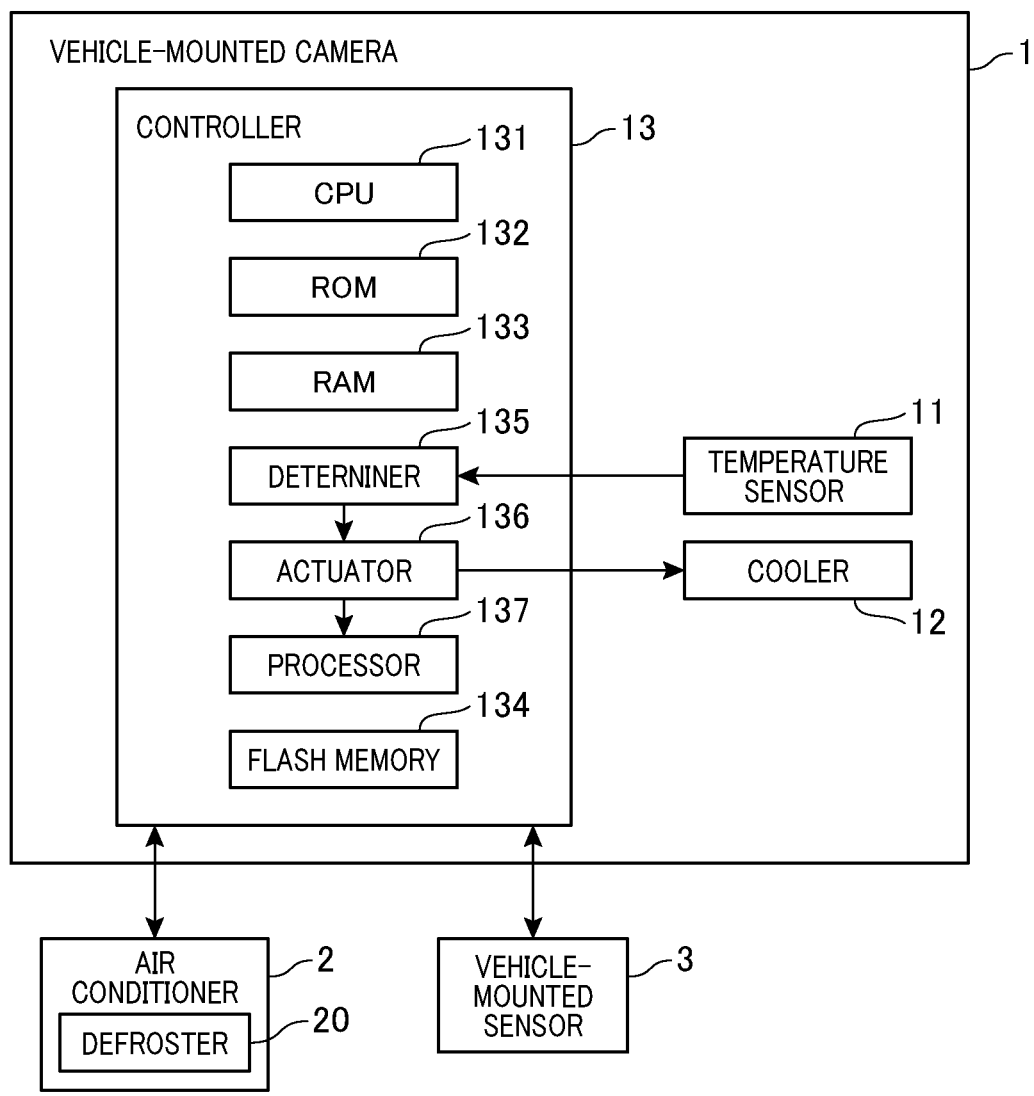
FIG. 5 is a block diagram illustrating an exemplary configuration of a camera cooler that cools the vehicle-mounted camera according to a second embodiment of the present disclosure.

As shown in FIG. 5, the second embodiment of the present disclosure includes a different configuration from that of the first embodiment of the present disclosure, such that a vehicle-mounted camera 1 is configured to be able to receive a detection result obtained and output from a vehicle-mounted sensor 3. The detection result obtained by the vehicle-mounted sensor 3 may be input to the vehicle-mounted camera 1 via one of a vehicle interior LAN, a direct input, and a radio equipment or the like.

In the second embodiment of the present disclosure, the vehicle-mounted sensor 3 may be composed of a raindrop sensor. The vehicle-mounted sensor 3 detects an amount of rainfall based on a number of raindrops put on a windshield 101 of the vehicle in a rainy condition. That is, a sound generated by the rain in an outside of the vehicle can be noise in the vehicle. It is assumed that a volume of sound of rain detected in the vehicle becomes larger in proportion to a number of raindrops, i.e., an amount of rain detected by the vehicle-mounted sensor 3. Hence, the vehicle-mounted camera 1 estimates the amount of noise, i.e., the volume of sound of the rain in the vehicle based on the amount of rainfall detected by the vehicle-mounted sensor 3.

Now, exemplary cooling operation performed by the controller 13 is herein below described with reference to a flowchart of FIG. 6. However, since processes executed in steps S201 to S206, S211 and S212 of FIG. 6 are substantially the same as the processes executed in respective steps S101, S102, S105, S106, S110, S111, S115 and S116 illustrated in FIG. 4, description of those is herein below not repeated.

Specifically, in step S207, the controller 13 estimates an amount of noise in the vehicle based on both of an operating condition of the air conditioner 2 and a detection result obtained by the vehicle-mounted sensor 3. In this embodiment of the present disclosure, the amount of noise estimated in the S207 is based on neither an actual amount of operation sound of the air conditioner 2 nor an actual volume of sound of rain, but is estimated based on predetermined given substitutive values of these value and amount, respectively.

Specifically, as in the first embodiment of the present disclosure, the operation sound of the air conditioner 2 is predetermined in accordance with the operation condition thereof. The sound of the rain is also predetermined based on an amount of rainfall detected by the vehicle-mounted sensor 3. Hence, in this second embodiment of the present disclosure, a total amount of noise may be estimated based on the sum of an amount of operation sound generated by the air conditioner 2 in accordance with an operating condition in a normal operation mode and a value calculated in accordance with an amount of rainfall detected by the vehicle-mounted sensor 3.

Subsequently, in step S208, the controller 13 determines if an amount of operation sound generated by a camera cooler 12 is greater than the amount of estimated noise. That is, when a difference in sound volume, i.e., a difference between the amount of operation sound of the camera cooler 12 and the estimated amount of noise, is greater than 0, it is determined that the amount of operation sound of the camera cooler 12 is greater than the estimated amount of noise, accordingly. By contrast, when the difference in sound volume is less than 0, it is determined that the amount of operation sound of the camera cooler 12 is not greater than the estimated amount of noise. An amount obtained when the difference is greater than 0 is herein below referred to as a shortage. In this embodiment of the present disclosure, the determination is made based on a value calculated by subtracting the amount of estimated noise from the amount of operation sound of the camera cooler 12. That is, when a difference in sound volume, i.e., a difference between the amount of operation sound of the camera cooler 12 and the estimated amount of noise, is greater than 0, it is determined that the amount of operation sound of the camera cooler 12 is greater than the estimated amount of noise, accordingly. By contrast, when the difference in sound volume is less than 0, it is determined that the amount of operation sound of the camera cooler 12 is not greater than the estimated amount of noise, when the difference is greater than 0, such a difference is herein below referred to as a shortage.

Hence, in step S208, if the controller 13 determines that the amount of operation sound of the camera cooler 12 is greater than the estimated amount of noise (Yes, in step S208), the process proceeds to step S209. In step S209, the controller 13 controls the air conditioner 2 to operate in the forcible operation mode to generate a noise greater than the shortage. In this embodiment of the present disclosure, the air conditioner 2 is operated to provide minimum performance only capable of compensating for the shortage such that an amount of noise in the vehicle after the air conditioner 2 is operated in the forcible operation mode is greater than an amount of operation sound of the camera cooler 12. Subsequently, the cooling process of FIG. 4 is terminated.

By contrast, in step S208, if the controller 13 determines that the amount of operation sound of the camera cooler 12 is not greater than the estimated amount of noise (No, in step S208), the process proceeds to step S210. In step S210, when the air conditioner 2 is operating in the forcible operation mode, the controller 13 terminates (i.e., resets) the forcible operation mode and brings an operation condition back to the normal operation mode. At that time, however, when the air conditioner 2 is operating in the normal operation mode, the controller 13 keeps such an operation condition. Subsequently, the cooling process of FIG. 4 is terminated.

Hence, according to the second embodiment of the present disclosure, the blow described advantages can be obtained partially in addition to the advantages obtained by the above-described first embodiment of the present disclosure.

That is, according to this second embodiment of the present disclosure, the amount of noise in the vehicle is estimated when the air conditioner 2 operates in the normal operation mode. If the estimated amount of noise is smaller than the amount of operation sound of the camera cooler 12, the sound generation process is performed based on the difference in sound volume. By contrast, when the estimated amount of noise is greater than the amount of operation sound of the camera cooler 12, the sound generation process is not performed. Further, even when the air conditioner 2 is controlled to operate in the forcible operation mode, the air conditioner 2 operates by providing minimum performance only capable of compensating for the shortage. Hence, while cancelling or concealing the operation sound of the camera cooler 12 by using both of the noise in the vehicle and the operation sound of the air conditioner 2 as well, the operation sound of the air conditioner 2 can be more effectively reduced. Further, when the operation sound of the camera cooler 12 can be cancelled or concealed only by a given amount of noise in the interior of the vehicle, generation of operation sound can be either suppressed or omitted.

According to the second embodiment of the present disclosure, the steps S201, S203 and S205 collectively represent a process performed by the determiner 135. The steps S202, S204 and S206 collectively represent a process performed by the actuator 136. Further, the step S208 represents a process performed by the noise estimator. Further, the step S209 is a process performed by the processor.

Herein below, exemplary modifications are described with reference to applicable drawings.

In the present disclosure, the vehicle-mounted camera 1 is attached to the inner surface of the windshield 101 as one example of a system, in which the vehicle-mounted camera 1 is disposed inside of the windshield 101 of the vehicle. However, the present disclosure is not limited thereto and the vehicle-mounted camera 1 may be placed on a back side of a rear-view mirror as a modification.

Further, in each of the above-described embodiments of the present disclosure, although the camera cooler 12 is attached to the housing of the vehicle-mounted camera 1, the present disclosure is not limited thereto. That is, the camera cooler 12 can be attached to either a bracket 102 or a design cover 13 thereof, for example.

Further, in each of the above-described embodiments of the present disclosure, although the high temperature state of the vehicle-mounted camera 1 is determined based on the degree of temperature detected by the temperature sensor 11, the present disclosure is not limited thereto. That is, the high temperature state can be determined based on a noise in an imaging area detected by the vehicle-mounted camera 1, for example.

Further, in each of the above-described embodiments of the present disclosure, although the total amount of noise in the vehicle is estimated based on the sum of the amount of the operation sound of the air conditioner 2 and the value determined in accordance with the amount of rainfall detected by the vehicle-mounted sensor 3, the present disclosure is not limited thereto. That is, the estimation can be made based on a relation between values of respective parameters previously stored in a memory and an amount of noise.

Further, in each of the above-described embodiments of the present disclosure, although the air conditioner 2 is operated to generate operation sound capable of concealing the operation sound of the camera cooler 12, the present disclosure is not limited thereto. That is, an audio system can be operated as described below, for example. Specifically, similar to the quantity of the air of the air conditioner 2, a volume of the audio system can be adjusted as described below. Specifically, if the audio system is already operating and a volume thereof is not more than an amount of an operation sound of the camera cooler 12, the volume of the audio system is increased to be equivalent to the amount of operation sound of the camera cooler 12 or more in each of the first to third modes M1 to M3. Further, when the audio system is already operating and a sound volume thereof has been adjusted to be greater than the amount of operation sound of the camera cooler 12 in each of the first to third modes of an, operating condition is returned to a previous operating condition used before the adjustment of the sound volume. By contrast, when the volume has not been adjusted in the same situation, an operating condition is maintained. Further, when the audio system is not operating, the audio system is operated and the volume of the audio system is adjusted to be equivalent to the amount of operation sound of the camera cooler 12 or more in each of the first to third modes M1 to M3. Further, a frequency of operation sound of the camera cooler 12 is analyzed and a sound with a frequency capable of making the operation sound of the camera cooler 12 unnoticeable may be output from the audio system.

Further, in the above-described second embodiment of the present disclosure, although the rain sensor is used to estimate the amount of noise in the vehicle, the present disclosure is not limited thereto. That is, as the vehicle-mounted sensor 3, a vehicle speed sensor or a window sensor to detect an opening or closing state of a window and the like can be employed. For example, when the vehicle speed sensor is used to detect an amount of noise in the vehicle, it is estimated that the faster the driving speed, the larger the amount of noise in the vehicle. Hence, similar to the situation where the raindrop sensor is used, the amount of noise in the vehicle may be estimated based on the sum of the amount of the operation sound of the air conditioner 2 and an amount of noise predetermined in accordance with the vehicle speed of the own vehicle. Further, when the window sensor is used to detect an amount of noise in the vehicle, it is assumed that the wider the window opens, the louder the noise in the vehicle. Hence, similar to the situation where the raindrop sensor is used, the amount of noise in the vehicle may be estimated based on the sum of the amount of the operation sound of the air conditioner 2 and an amount of noise predetermined in accordance with the opening or closing state of the window. Furthermore, a combination of any two or more of these raindrop sensor, vehicle speed sensor, and window sensor or the like can be used to detect an amount of noise in the vehicle as well. Further, in estimation of the amount of noise in the vehicle, a volume of the audio system may be additionally used.

Further, in the above-described embodiments of the present disclosure, although the amount of noise in the vehicle is estimated based on a predetermined substitutive value of sound (i.e., noise), the present disclosure is not limited thereto. That is, the amount of noise can be estimated based on a volume of sound actually detected in the vehicle by an audio microphone or similar devices as well.

Further, a function performed by one component employed each of the above-described embodiments of the present disclosure can be performed by two or more components. By contrast, respective functions of multiple components employed each of the above-described embodiments of the present disclosure can be performed by one component as well. Further, the configurations of each of the above-described embodiments of the present disclosure can be partially omitted as needed without spoiling a necessary function. Further, the configurations of the above-described embodiments of the present disclosure can be at least partially added to or exchanged with each other.

Beside the above-described vehicle-mounted camera 1, the present invention can be embodied by various categories, such as a system having the vehicle-mounted camera 1 as a component, program implemented by a computer to act as a controller 13 to control the vehicle-mounted camera 1, and a computer readable non-transitory medium storing the program, a method of cooling the vehicle-mounted camera 1, etc.

Numerous additional modifications and variations of the present disclosure are possible in light of the above teachings. It is therefore to be understood that within the scope of the appended claims, the present disclosure may be executed otherwise than as specifically described herein. For example, the vehicle-mounted camera is not limited to the above-described various embodiments and may be altered as appropriate. Similarly, the vehicle-mounted system is not limited to the above-described various embodiments and may be altered as appropriate. Further, the vehicle-mounted camera using method is not limited to the above-described various embodiments and may be altered as appropriate again.

What is claimed is:

1. A vehicle-mounted camera disposed inside of a housing, the housing being positioned inside of an upper part of a windshield of a vehicle and within an interior of the vehicle, the vehicle-mounted camera comprising:
   a camera cooler comprising a cooling fan attached to either a rear side or a bottom side of the housing close to ears of a driver driving the vehicle, the cooling fan configured to cool the vehicle-mounted camera; and
   a controller, the controller including
      a determiner to periodically determine whether the vehicle-mounted camera is in a high temperature state of a given degree of temperature after an ignition switch is turned on,
      an actuator to activate the camera cooler when the determiner determines that the vehicle-mounted camera is in the high temperature state, and
      a processor to perform a concealing sound generation process to generate concealing sound only for an occupant in the vehicle to conceal operation sound generated by the camera cooler within the interior of the vehicle when the camera cooler operates, and
      an interior noise estimator to estimate an amount of interior noise of the vehicle,
   wherein the processor does not perform the concealing sound generation process when the interior noise estimator estimates that the amount of interior noise of the vehicle is greater than an amount of operation sound of the camera cooler.

2. The vehicle-mounted camera as claimed in claim 1, wherein the processor activates an air conditioner installed in the vehicle, the air conditioner performing the concealing sound generation process by generating operation sound.

3. The vehicle-mounted camera as claimed in claim 1, wherein the processor activates an audio system installed in the vehicle, the audio system performing the concealing sound generation process by generating sound.

4. The vehicle-mounted camera as claimed in claim 2, wherein the determiner further determines whether the vehicle-mounted camera is in either a first high temperature state of a first degree of temperature or a second high temperature state of a second degree of temperature higher than the first degree of temperature when the vehicle-mounted camera is in the high temperature state,
   wherein the actuator activates the camera cooler to operate in a first mode when the determiner determines that the vehicle-mounted camera is in the first high temperature state, the actuator activating the camera cooler to operate in a second mode providing greater cooling performance than the first mode when the determiner determines that the vehicle-mounted camera is in the second high temperature state,
   wherein the processor controls the air conditioner to operate generating louder operation sound when the camera cooler operates in the second mode than when the camera cooler operates in the first mode.

5. The vehicle-mounted camera as claimed in claim 2, wherein the determiner further determines whether the vehicle-mounted camera is in either a first high temperature state of a first degree of temperature or a second high temperature state of a second degree of temperature higher than the first degree of temperature when the vehicle-mounted camera is in the high temperature state,
   wherein the actuator activates the camera cooler to operate in a first mode when the determiner determines that the vehicle-mounted camera is in the first high temperature state, the actuator activating the camera cooler to operate in a second mode providing greater cooling performance than the first mode when the determiner determines that the vehicle-mounted camera is in the second high temperature state,
   wherein the processor controls the air conditioner to operate without activating a defroster installed in the air conditioner when the camera cooler operates in the first mode, the processor controlling the air conditioner to operate together with the defroster when the camera cooler operates in the second mode.

6. The vehicle-mounted camera as claimed in claim 1, wherein the processor performs the concealing sound generation process based on a difference between the amount of interior noise of the vehicle and that of the operation sound of the camera cooler when the processor determines that the amount of interior noise is less than the amount of operation sound of the camera cooler.

7. The vehicle-mounted camera as claimed in claim 1, wherein the interior noise estimator estimates the amount of interior noise of the vehicle based on a detection result obtained by a vehicle-mounted sensor mounted on the vehicle.

8. The vehicle-mounted camera as claimed in claim 7, wherein the interior noise estimator estimates the amount of interior noise of the vehicle in accordance with at least one of an amount of rainfall, an own vehicle speed, and an opening or closing state of a window detected by the vehicle-mounted sensor.

9. The vehicle-mounted camera as claimed in claim 1, further comprising a temperature sensor, wherein the determiner determines the high temperature state based on a degree of temperature detected by the temperature sensor.

10. A vehicle-mounted system, comprising:
    a vehicle-mounted camera disposed inside of a housing, the housing being positioned inside of a windshield of a vehicle and within an interior of the vehicle;
    the vehicle-mounted camera including:
       a camera cooler comprising a cooling fan attached to the housing, the cooling fan configured to cool the vehicle-mounted camera;
       a controller,
       the controller including
          a determiner to determine whether the vehicle-mounted camera is in a high temperature state of a given degree of temperature,
          an actuator to activate the camera cooler when the determiner determines that the vehicle-mounted camera is in the high temperature state,
          a processor to perform a concealing sound generation process to generate concealing sound to conceal operation sound generated by the camera cooler within the interior of the vehicle when the camera cooler operates, and an interior noise estimator to estimate an amount of interior noise of the vehicle;

an air conditioner with a defroster; and an audio system, wherein the processor activates at least one of the air conditioner and the audio system to perform the concealing sound generation process to generate applicable one of operation sound and sound, and wherein the processor does not perform the concealing sound generation process when the interior noise estimator estimates that the amount of interior noise of the vehicle is greater than an amount of operation sound of the camera cooler.

11. A method of using a vehicle-mounted camera system including a vehicle-mounted camera disposed inside of a windshield of a vehicle and a camera cooler to cool the vehicle-mounted camera, the vehicle-mounted camera disposed inside of a housing, the housing being positioned within an interior of the vehicle, the camera cooler comprising a cooling fan attached to the housing, the cooling fan configured to cool the vehicle-mounted camera, the method comprising the steps of:

detecting a degree of temperature of the vehicle-mounted camera;

determining whether the vehicle-mounted camera is in a high temperature state of a given degree of temperature;

cooling the vehicle-mounted camera with the camera cooler for a state in which the vehicle-mounted camera is in the high temperature state;

performing a concealing sound generation process to generate concealing sound to conceal operation sound generated by the camera cooler within the interior of the vehicle for a state in which the operation sound of the camera cooler is a given level; and estimating an amount of interior noise of the vehicle, wherein the concealing sound generation process is not performed in response to the amount of interior noise of the vehicle being estimated to be greater than an amount of operation sound of the camera cooler.

* * * * *